(12) United States Patent
Büstgens

(10) Patent No.: US 11,679,597 B2
(45) Date of Patent: Jun. 20, 2023

(54) DROP-ON-DEMAND—COATING OF SURFACES

(71) Applicant: Burkhard Büstgens, Gundelfingen (DE)

(72) Inventor: Burkhard Büstgens, Gundelfingen (DE)

(73) Assignee: EXEL INDUSTRIES S.A., Epernay (FR)

( * ) Notice: Subject to any disclaimer, the term of this patent is extended or adjusted under 35 U.S.C. 154(b) by 16 days.

(21) Appl. No.: 17/048,329

(22) PCT Filed: Apr. 16, 2019

(86) PCT No.: PCT/DE2019/000105
§ 371 (c)(1),
(2) Date: Oct. 16, 2020

(87) PCT Pub. No.: WO2019/201367
PCT Pub. Date: Oct. 24, 2019

(65) Prior Publication Data
US 2021/0170763 A1    Jun. 10, 2021

(30) Foreign Application Priority Data
Apr. 17, 2018 (DE) .......................... 102018003096.3

(51) Int. Cl.
*B41J 2/21* (2006.01)
*B05D 1/26* (2006.01)
*B05B 13/04* (2006.01)

(52) U.S. Cl.
CPC ......... *B41J 2/2132* (2013.01); *B05B 13/0452* (2013.01); *B05D 1/26* (2013.01)

(58) Field of Classification Search
None
See application file for complete search history.

(56) References Cited

U.S. PATENT DOCUMENTS

| 6,096,132 A * | 8/2000 | Kaiba ..................... B05B 12/00 |
| | | 118/712 |
| 9,452,616 B1 | 9/2016 | Mathis et al. |
| | | (Continued) |

FOREIGN PATENT DOCUMENTS

| EP | 1839884 | 10/2007 |
| EP | 2208541 | 7/2010 |
| | (Continued) | |

OTHER PUBLICATIONS

PCT International Preliminary Report on Patentability and PCT Written Opinion of the International Searching Authority—dated Oct. 20, 2020.

(Continued)

*Primary Examiner* — Michael P. Rodriguez
(74) *Attorney, Agent, or Firm* — Lott & Fischer, PL

(57) ABSTRACT

A coating of a coating medium, produced by means of a multichannel printhead (5) in a coating region (3) on a two- or three-dimensional surface (2) of an object (1), which is built up from coating points (8) along tracks (7) of one or more coating paths (6), characterized in that the starting coating point (HP) of at least one track (7) is aligned with a starting contour (AK) and an end coating point (EP) of the track (7) is aligned with an end contour (EK).

21 Claims, 11 Drawing Sheets

(56) References Cited

U.S. PATENT DOCUMENTS

| | | | |
|---|---|---|---|
| 2001/0019340 A1 | 9/2001 | Kubo et al. | |
| 2009/0167817 A1 | 7/2009 | Orr | |
| 2014/0132673 A1 | 5/2014 | Lewartowski et al. | |
| 2014/0242285 A1* | 8/2014 | Pettersson | B41J 3/4073 427/427.2 |
| 2016/0052312 A1 | 2/2016 | Pitz et al. | |
| 2016/0355026 A1 | 12/2016 | Mathis et al. | |
| 2017/0232733 A1* | 8/2017 | Rupprecht | B41J 2/04536 347/14 |

FOREIGN PATENT DOCUMENTS

| | | |
|---|---|---|
| EP | 2567822 | 3/2013 |
| EP | 3208746 | 8/2017 |
| EP | 3213823 | 9/2017 |
| JP | 2016 077 971 | 5/2016 |
| JP | 2016077971 | 5/2016 |
| JP | 2016221958 | 12/2016 |
| JP | 2017018884 | 1/2017 |
| JP | 2017144738 | 8/2017 |
| JP | 2017192932 | 10/2017 |
| JP | 2008 191 903 | 8/2021 |
| WO | 2020048854 | 3/2020 |

OTHER PUBLICATIONS

Japanese Patent Office—Office Action dated Sep. 13, 2022 in Patent Application No. 2020-506039.
European Application No. 19 726 557.2—Office Action dated Dec. 20, 2022.

* cited by examiner

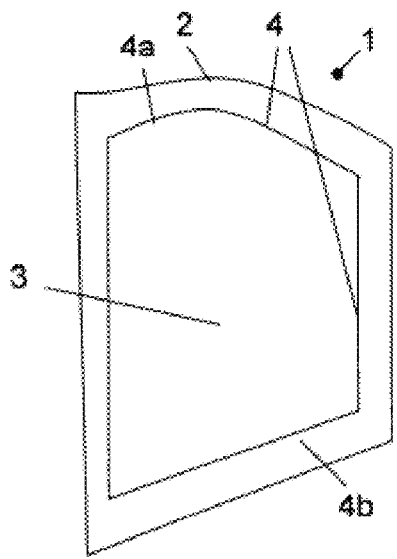
Fig. 1
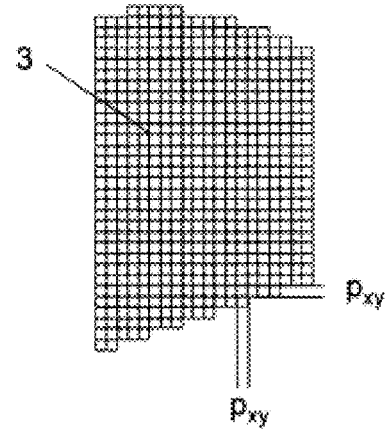
Fig. 2, Prior Art
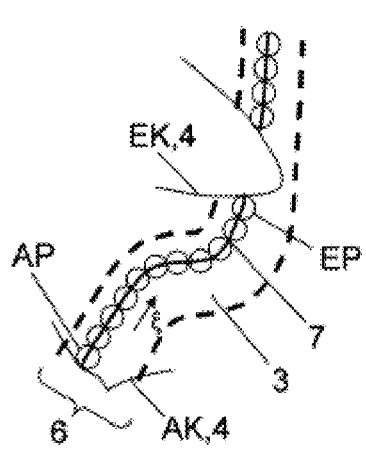
Fig. 3a
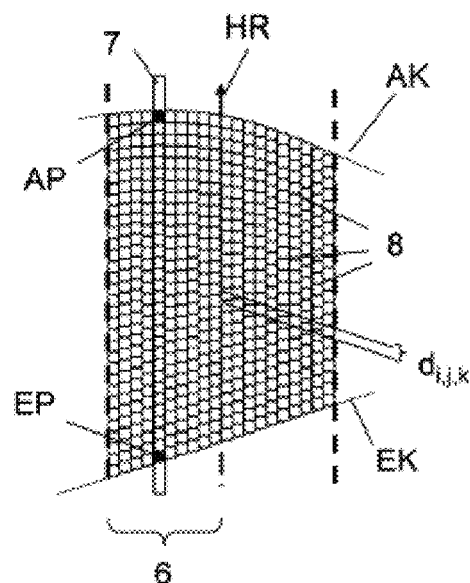
Fig. 3b

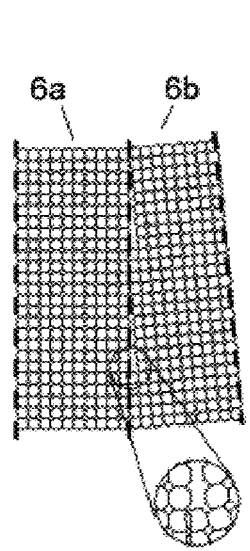
Fig. 4, Prior Art
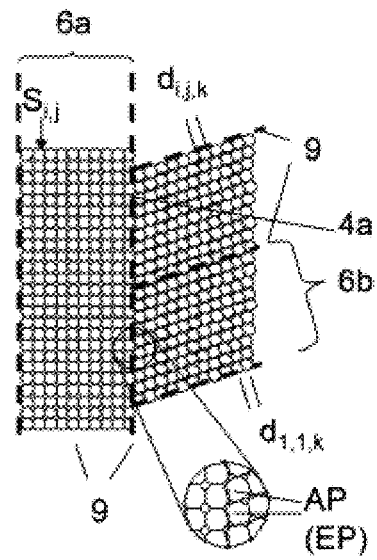
Fig. 5
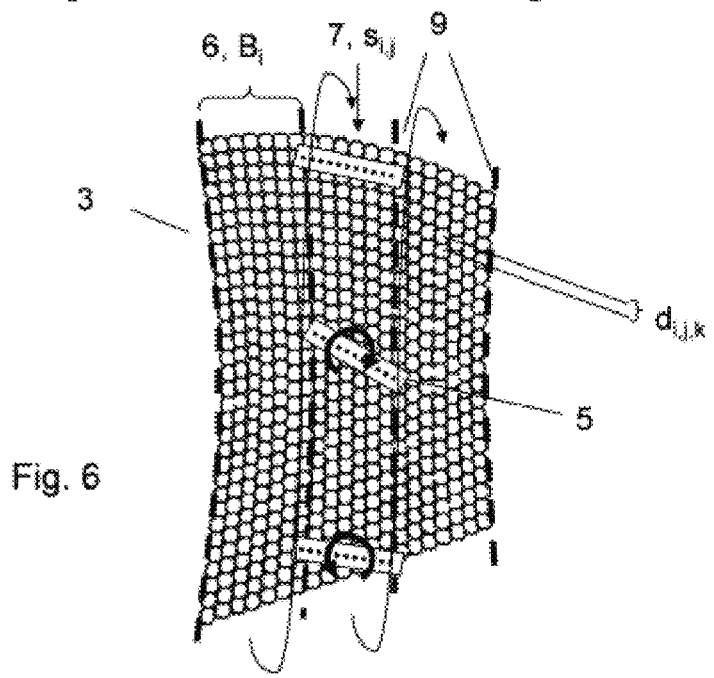
Fig. 6

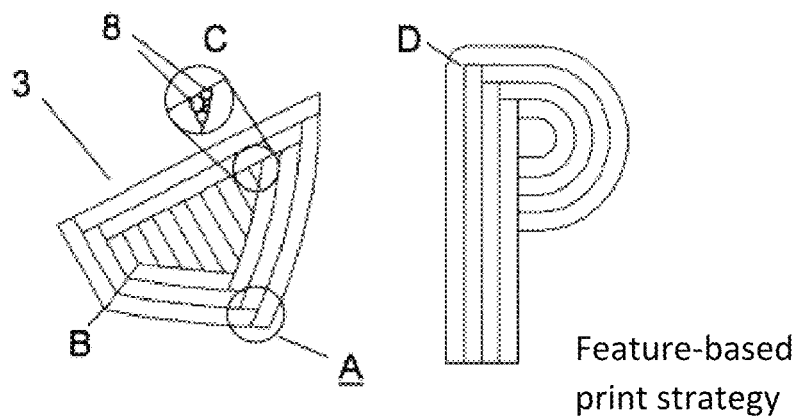
Fig. 7a
Fig. 7b
Feature-based print strategy
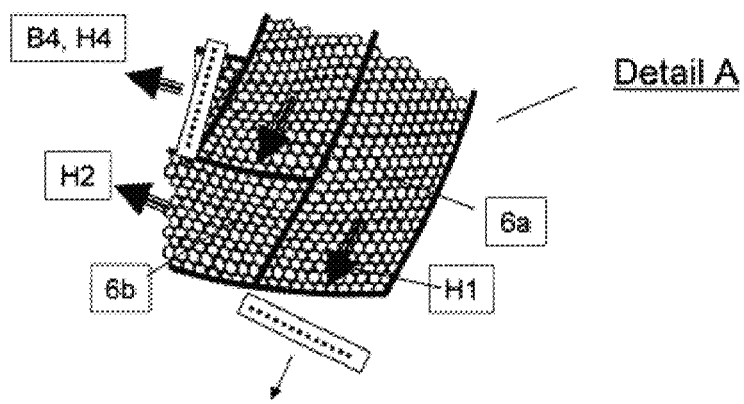
Fig. 8

DROP-ON-DEMAND—COATING OF SURFACES

This application is a national phase of PCT Application No. PCT/EP2019/000105 filed Apr. 16, 2019, the contents of which are hereby incorporated by reference.

The present invention relates to a coating, a method and a device having the features of the preamble of the first claim.

The invention lies in the technical field of contact-free coating of flat (2D) or curved (3D) surfaces 2 of objects 1, in particular of industrial products, vehicles such as automobiles, aircraft, ships or trains, or vehicle parts, by means of liquid coating agents such as paints, lacquers, inks, sealants or adhesives using drop or jet based application heads (hereinafter coating head), which are guided over the surface by coating robots, which here generally stand for mechanical, automated Cartesian and/or polar movement apparatus, by mobile robots or by industrial robots, for example with 6 movement axes or combinations thereof, i.e. with arbitrarily designed programmable movement automats. Coating heads in the sense of this invention are to be any kind of fluid applicators from which coating agents are ejected through several or a multitude of nozzles as discrete drops, clouds of drops or jets, which settle freely flying on the surface 2. The multi or multichannel capability is a basic requirement for a productive coating process with a high surface coating rate. Coating heads are mainly multichannel drop-on-demand (DOD) heads, which, for example, eject a pressurized fluid by means of fast-switching valves or work according to another operating principle. For specific applications, a conventional ink jet head can also be understood as a coating head, which uses piezo or heating elements to build up a transient pressure to eject an ink. To achieve a high coating rate, the largest possible number of print nozzles in a coating head is necessary. Nevertheless, the application width of a coating head is usually smaller than the width of the coating region 3, so the coating agent is usually applied in several laterally connected coating paths 6. Coating region 3 is here the geometry of a coating or a coating pattern on a surface 2. A coating region 3 is defined geometrically essentially by its edge contours 4.

Particularly when coating surfaces with viscous coating agents, there is the problem that only a low print pattern resolution can be achieved compared to graphic inkjet printing due to the physically induced drop sizes in the nanoliter range.

When using today's orthogonal griding technique—the coating points are arranged in a rigid x-y grid—this may lead to a highly visible step formation at coating edges; see for example FIG. 2 (prior art). Step formation is particularly disturbing, if an edge in relation to the grid is within +/−5° of the vertical or horizontal of such a grid; see FIG. 4*a* (prior art), whereby the exact vertical and horizontal is excluded.

These critical angles also occur more frequently if the area 1, which contains coating region 3, has an area curvature (convex or concave), as is the case with the abovementioned application areas. In the case of a 2-dimensional surface curvature, for example, a coating path 6 always appears convexly curved from the perspective of the nearest coating path, so that for seamless connection, this coating path must have a convexly curved edge 9. Since the rows of nozzles in coating heads are rigid, i.e. the individual nozzles have different distances and orientations in relation to a 3D surface, the difficulty of coating 3D surfaces free of defects ("artifacts") increases with decreasing surface curvature radii.

Theoretically, all these problems could easily be eliminated if all points were applied to the surface in a free way with a single nozzle. However, no productive work processes for coating application are possible in this way. Therefore, one is dependent on the use of coating heads that have the largest possible number of nozzles, have the largest possible total application width and thus have a sufficiently high flat coating rate for industrial purposes.

The known prior art includes the following: to compensate for smaller non-parallelism of a coating region such as a car roof, reference is made to publication DE 10 2014 017 707 A1. The latter is based on the use of a non-rotationally symmetrical coating agent jet and suggests the rotation of the applicator about the jet axis during path movement. Thus, the effective application width in the path direction can be changed by tilting the applicator and curved edges can be reproduced to a certain extent. Since the remote sides of the coating agent jet move at different speeds relative to the surface during rotation due to the superimposition of path movement and rotation, which has a direct influence on the coating thickness, only low rotation speeds are permitted overall.

In DE 10 2014 it is proposed for the graphic inkjet printing of 3D surfaces, in particular vehicles, that the print image should be composed of many straight path pieces, each of which should run diagonally to each other, preferably at angles roughly around 45 (135) degrees, in any case far away from the critical angles described above. The possibility of deviating from a rectangular shape of a print path by twisting the inkjet head during the movement is also considered. Nevertheless, the possibilities to print any multi-curved 3D surfaces completely and free of artifacts are limited here as well.

DE 10 2012 005 650.8 proposes an application device for the application of inks or lacquers by means of manual, automatic or robotic guidance. The DOD coating head contained in it can perform curved paths, even narrow circular movements. This allows the coating head to be rotated around the vertical surfaces during the line movement, but this means that different nozzles have to deliver a different number of coating points per time, so that the coating points of all nozzles maintain the same distance to each other. In contrast to prior art coating head controls, which only provide a single firing frequency for all nozzles, the individual nozzles can fire at any time or are controlled with different firing frequencies. However, this publication does not provide a solution for avoiding step formation at the edges of coating regions that are not perpendicular or parallel to the direction of the coating paths 6.

Thus, the object of the invention is to create a suitable print image as well as suitable printing processes and devices in order to apply any coating region 3 without visible step formation at edges by means of coating heads with the largest possible number of printing nozzles arranged fixed in lines, in particular also with nozzle spacing down to the millimeter range, and within the coating free of artifacts in the form of local bottom coatings or top coatings between adjacent coating paths on two- or three-dimensional surfaces with a high coating rate in the range of square meters per minute.

The task is solved by the print image and process according to the invention, which is based on the fact that the coating region 3 must be divided in some way into one or more coating paths 6. These must fit perfectly and step-free to adjacent coating paths 6 or to edges of coating region 3. This is achieved by positioning the coating points 8 on tracks 7 within the coating paths 6 according to the invention in such a way that contours can be optimally reproduced. The present invention provides the methods and devices for reducing the step formation at the edges of a coating region 3. In this context, the printed image is understood to be the entirety of all coating points 8, of which coating region 3 is comprised. It is irrelevant whether individual coating points 8 are actually still visible after drying or whether the individual coating points 8 have run perfectly.

According to the invention, a coating (within the meaning of an "applied layer") of a coating agent produced by means of a multichannel print head 5 in a coating region 3 on a two- or three-dimensional surface 2 of an object 1 is thus built up from coating points 8 along tracks 7 of one or more coating paths 6, characterized in that the starting coating point AP of at least one track 7 is aligned with a starting contour AK and the end coating point EP of track 7 is aligned with an end contour EK.

The printed image according to the invention deviates from an orthogonal grid; the process of drop delivery from the printing nozzles of the coating head can be described as asynchronous, since the coating points 8 of the different coating paths 7 produced by a coating head 5 are individually offset from one another and can have different distances d_p to one another. A template of a coating region 3 in the form of a grid image or a vector graphic must be transformed by a data processing system (DP system) into a data format according to the invention, and printing process control according to the invention is required both in terms of surface processing and coating head control.

An starting or end contour can be straight, curved and itself composed of several contours. It can be a pure auxiliary line and remain invisible in the printed image, for example for the generation of further coating points 8, or a real existing contour on the surface 2, such as an edge of the coating region 3, or an edge of another coating path 6.

According to the invention, further coating points 8 on track 7 are fitted in between the start coating point AP and the end coating point EP.

According to the invention, this is preferably applied to all tracks 7 and track sections of all coating paths 6. A track 7 of a coating path 6 is thus understood as the quantity of coating points 8 generated between a start and end coating point by a specific printing nozzle of coating head 5. The quantity of all coating points 8 applied within a coating path by a printing nozzle of coating head 5 can be called total track. Thus, the total track may well cross several start and end contours, which results in several tracks and which is the case, for example, if a coating region 3 contains further patterns, letters or graphics inside, or if the edge area is interlocked with the adjacent coating path 6.

A coating path 7 itself can have any curvature. The aforementioned contours can be oriented diagonally or perpendicular to the course of the path and can themselves have any desired curvature.

For example, the remaining coating points on track 7 between AP and EP can be fitted in such a way that the dot spacing of adjacent coating points corresponds as exactly as possible to the track spacing. In this way, the same point density is achieved as for a classical as well as a corresponding orthogonal (xy) grid. In principle, however, any dot spacing is also conceivable.

The determination of the point distance between adjacent coating points 8, a track 7 follows for example according to the following calculation rule: calculation of the track length LS between AP and EP; integer division of the track length by the nominal point distance d_xy results in the number of points n; the remainder of the integer division (modulo) is divided by the number of points n, which results in the distance correction ddp; finally, the result is the point distance to $$d\_p = d\_xy + ddp.$$

If one looks at the result of the printed image according to the invention in FIG. 3b with a prior art orthogonal grid graphics as in FIG. 2, a strong improvement of the edge quality is discernible at both the upper and lower edges and no step formation can be seen. The reproduction of the edges is almost perfect.

In contrast to the usual grid-oriented print image, the print image according to the invention achieves both a far better contour reproduction and a surface coating that is free of defects, since fewer defects such as bottom or top coatings occur at the transitions between coating paths 6.

Thus, the process according to the invention opens up the possibility of using low-resolution printing techniques for an application that would actually require higher optical imaging qualities. Alternatively, the print quality of existing high-resolution coating heads can be further improved.

According to the invention, the starting and/or end coating points can be aligned with contours with an accuracy far below an original dot pitch p_xy, for example with 1 to 10% of the grid dimension compared to a grid graphic with the dot pitch p_xy. At this point, it should be explicitly pointed out that the designation coating point 8 does not necessarily have to be synonymous with a dotted or circular shape. Rather, this idea represents an idealization that is rarely found in real technology.

Therefore, a coating point should also be understood here as having different shapes, such as elliptical, elongated or laterally frayed shapes. In particular, it can be useful to design one or more coating points 8 on the surface as elongated or as a whole as lines that coincide with a track 7 of a coating path 6. All in all, a coating point 8 is thus to be understood as the deposit of an individually discretely controllable amount of a coating agent on a surface.

The start and end coating point of each track 7 is located as precisely as possible tangentially to the corresponding start or end contour. Alternatively, the points can be centered, tangential or arbitrarily offset from the contour, so that their center points coincide with the contour or have any distance to it. Thus, an alignment "at" or "with" an edge or an alignment with a positive or negative offset to it should not be interpreted within this invention in such a way that this excludes one of the other cases. With an offset, however, the user is provided with a means to compensate for the flow kinetics of a coating agent, which depend on many factors, in such a way that in the final result the optical edge of the coating coincides as desired with the preplanned coating region 3 as given in the template.

Several drawings are attached for the explanation of the invention and all its embodiments, applications and related processes.

The fitting of coating points 8 on a track 7 between AP and EP can in principle be done as desired. An inventive and advantageous further embodiment is that between the start coating point AP and the end coating point EP of the at least two tracks 7, the remaining coating points 8 on the respective track 7 are equidistant over the entire length or at least in sections.

It can be advantageous that different groups of coating points 8 on a track 6 have different dot spacings d_1. The dot spacing of at least one first group can be specified, for example, while the dot spacing of at least one remaining group is determined in such a way that the dots of a track with a satisfactory final result are inserted between the start coating point and the end coating point EP of the track in such a way that the coating has no optical defects. For the generation of the print image, it can be simplified, if at least one group is directly connected to a start coating point AP or end coating point EP.

It can also be advantageous if the individual distances d_k,i between coating points 8 of a track 7 have small offsets Δd along the track in positive or negative track direction to adjacent dots. These offsets can be generated deterministically by a fixed calculation rule or stochastically by random values and superimposed on the original or corrected position of a selection of coating points or all coating points 8 of a track 7. The benefit of, for example, small stochastic offsets of coating points in the range of <20%, <10% or <5% of a dot pitch is that the eye perceives a more uniform print image overall by reducing the visual perception of defects in the print image, such as lines or moiré effects.

If a constant drop volume of the coating material is assumed for the DOD application, a decrease in dot pitch is accompanied by an increase in the coating thickness, and an increase in dot pitch is accompanied by a corresponding decrease in the coating thickness. Dot pitch and film thickness are inversely proportional. According to the invention, it is possible to compensate for the difference in coating thickness by adjusting the drop size. For each dot of a track, the layer thickness is adjusted so that it is inversely proportional to at least one associated dot pitch d_k to an adjacent dot.

$$V\_drop \sim 1/d\_k$$

According to the invention, the drop volume of the coating points 8 is thus adjusted in such a way that the coating thickness corresponds on average to the target coating thickness.

If, for example, a track 7 contains hundreds to thousands of coating points 8, the aforementioned rules for the distribution of coating points on a track 7 between a start coating point AP and an end coating point EP can, however, already be implemented in such a way that the track of the coating points must be stretched or compressed by a maximum of one dot pitch. If, for example, it is assumed that within a track k a constant dot pitch d_k is selected for all coating points, the relative change of the dot pitch d_k compared to the original track distance d_xy in these cases is $1/100$ to $\ll 1/1000$. With a track distance of, for example, 0.5 millimeters, the correction of the dot pitches d_k is thus in the range of less than one percent relative to the original track distance d_xy even for very short (<5 cm) tracks 7.

Thus, using the example of a track 5 cm long, the coating thickness of the coating agent would also be reduced or increased by a maximum of 1%, depending on whether the dot arrangement on the track was stretched or compressed. For a 50 cm long track this would be 0.1%. Since these accuracies (a) are generally below the coating specification and (b) below the sum of the process inaccuracies (fluctuating properties of the coating agent, delivery of the coating agent, coating head, substrate fluctuations, tolerances of the movement tracks and speeds, etc.), it may still be possible to dispense with a coating thickness correction by adjusting the drop size. Also, the coating head technology may not offer the technical possibility to control the drop size in steps of 1% or less.

Therefore, it makes sense to use the drop size adjustment method when a group of coating points 8 has a constant dot pitch of p_k,1, which differs from the original dot pitch of p_xy by a larger relative factor F of, for example, 1%, 5% or 10%. In this case, it is useful to specify the factor F from the technical conditions in connection with the coating. In the next step, the dot pitch p_k,1 can then be determined for a group of coating points 8, so that ultimately p_k,1/p_xy=F or p_k,1/p_xy=1/F applies, depending on whether the track of the coating points 8 is stretched or compressed within the group.

The value of the factor F can be given, for example, by the smallest addressable drop size increment of a coating head, by the accuracy of a pressure source in the coating agent supply, or by the accuracy in maintaining material properties of the coating agent such as rheology.

Before further designs and devices, processes, possible path forms and coating strategies according to the invention are presented, the following list is intended to give an overview of the figures:

FIG. 1 serves to define the nomenclatures used.

FIG. 2 shows a coating result for a coating region 3 at the current prior art in grid graphics.

FIG. 3a illustrates the elements of the print image according to the invention using an exemplary coating path 6 with track 7 and coating points 8 in combination with contours 4.

FIG. 3b shows an example of the coating result according to the inventive principle for a coating region 3 as in FIG. 2.

FIG. 4 shows a current prior art coating result in grid graphics for two adjacent coating paths 6a and 6b whose path directions have an angular difference of <5 degrees.

FIG. 5 shows the coating result of the case of FIG. 4a after application of the inventive teaching and printing strategies.

Figure 9:
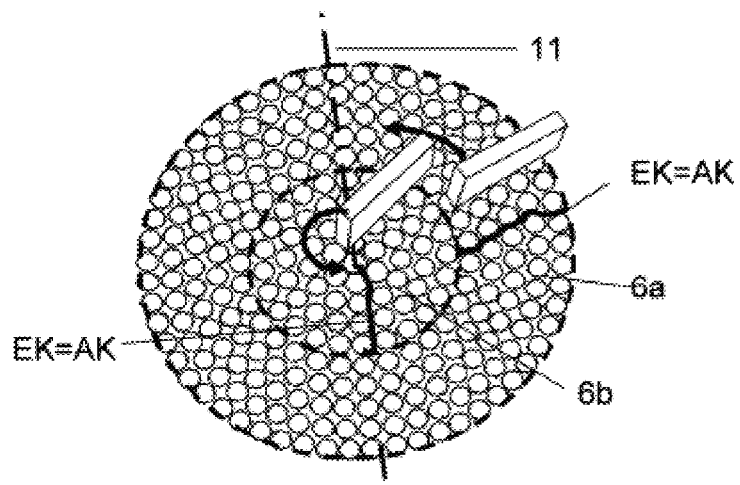

FIG. 6 shows the coating result after application of the inventive teaching and a printing strategy for a coating region with four curved edges. Here, the coating points 8 are distributed on tracks 7, the course of which results from a simultaneous rotation of the coating head 8 during the movement of the coating head 8 along the coating path 6.

FIG. 7a illustrates three strategies for printing a coating region of any shape 3.

FIG. 7b shows an example of a coating strategy for reproducing the print pattern "P" without step formation and with a coating path running around the circumference.

FIG. 8 shows the detail A in FIG. 7a magnified, so that the individual print dots 8 can be identified, thus illustrating the coating path guidance and angular positions of the coating heads 5 at different times.

FIG. 9 shows an example of a coating strategy for illustrating circular or even elliptical dot patterns.

Figures 10A, 10B:
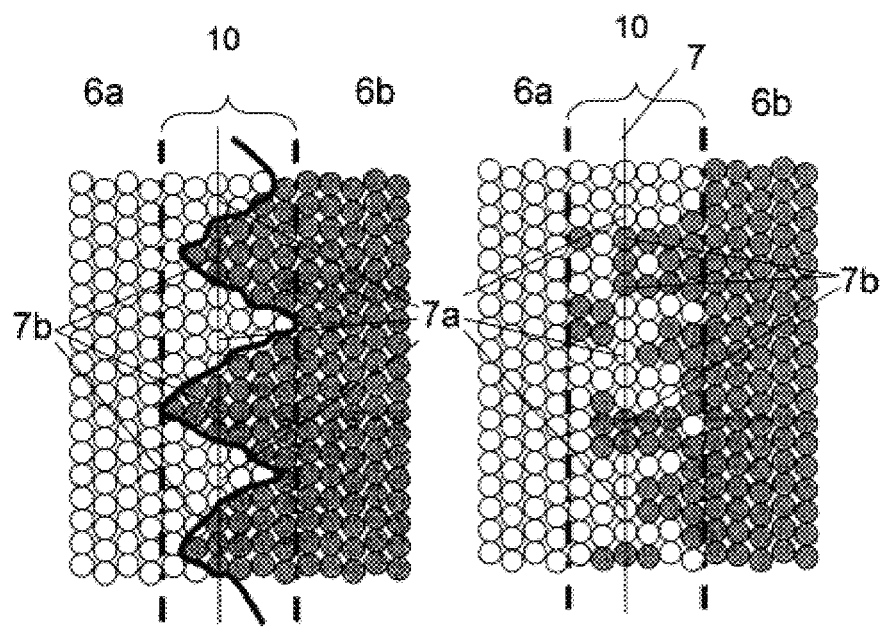

FIG. 10a shows an example of the lateral connection of two coating paths 6a and 6b by means of an overlap area 10 using a jagged contour ("stitching").

FIG. 10b shows an example of the connection of two coating paths 6a and 6b by means of an overlap area 10 with essentially free distribution of printing points 8 between congruent tracks 7 of the two coating paths.

Figure 11:
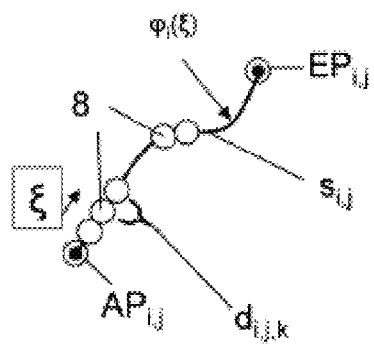

FIG. 11 shows essential nomenclatures in connection with printing points—generation on one track $s_{i,j}$.

Figure 12:
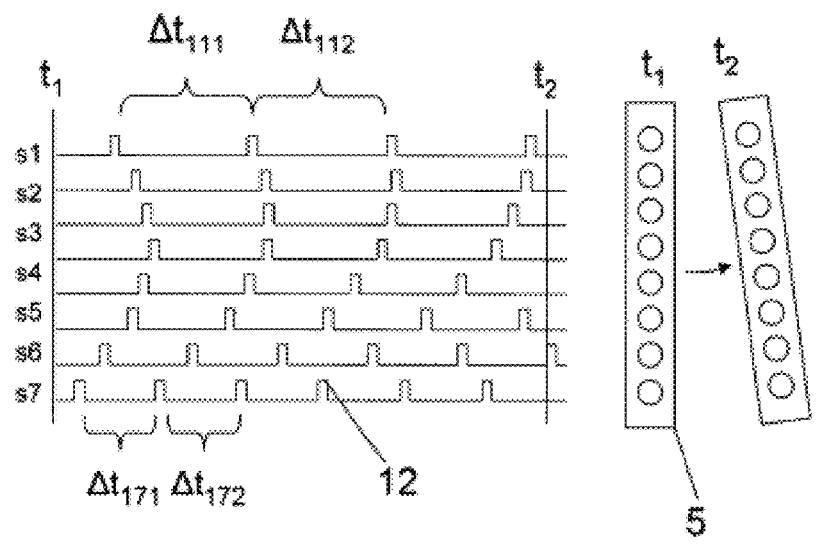

FIG. 12 shows an example of the temporal sequence of firing times to the seven printing nozzles 8 of a coating head 5, for example, when moving along a curved coating segment.

Figure 13:
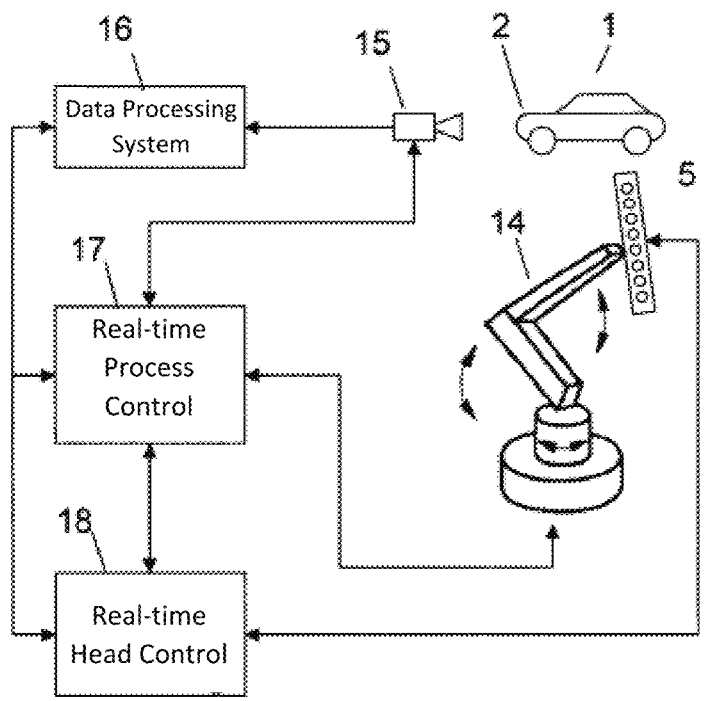

FIG. 13 schematically shows a system structure for the application of coating regions 3 to three-dimensional surfaces 2 of objects 1 according to the invention.

Figure 14:
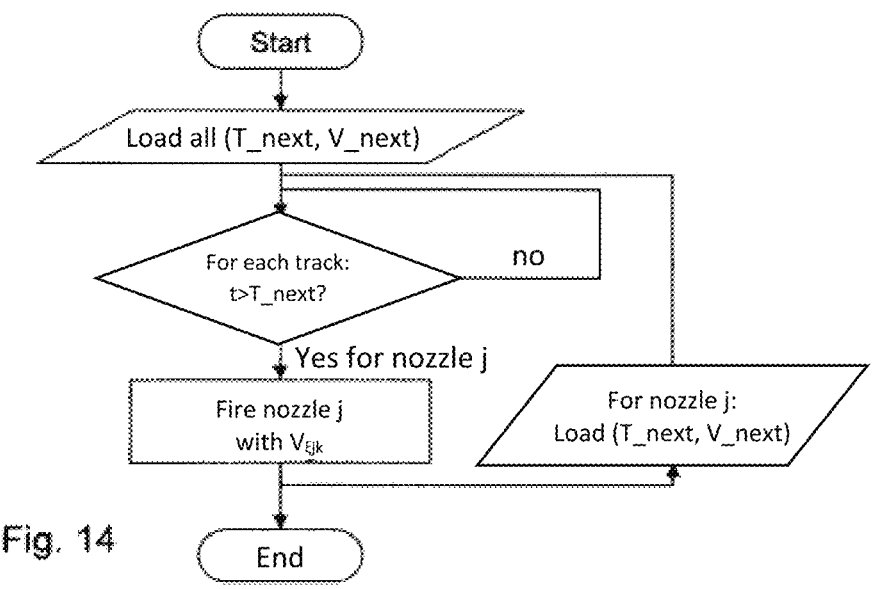

FIG. 14 illustrates essential elements of an algorithm of a microprocessor within a real-time head control 18 for the time-asynchronous control of printing nozzles of a coating head 5.

Figure 15:
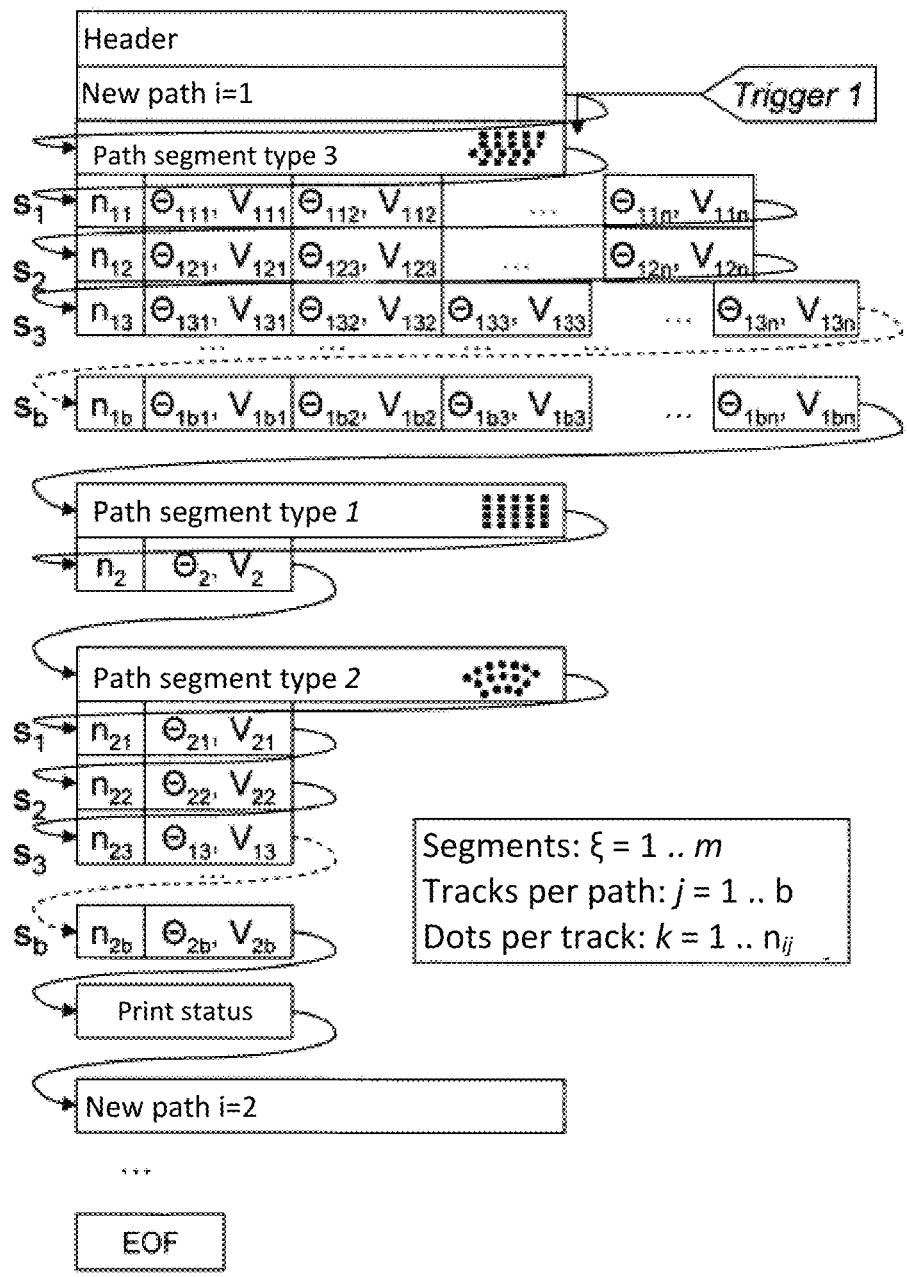

FIG. 15 shows an example of a possible data format for the communication of print data to the real-time head control 18.

Figure 16:
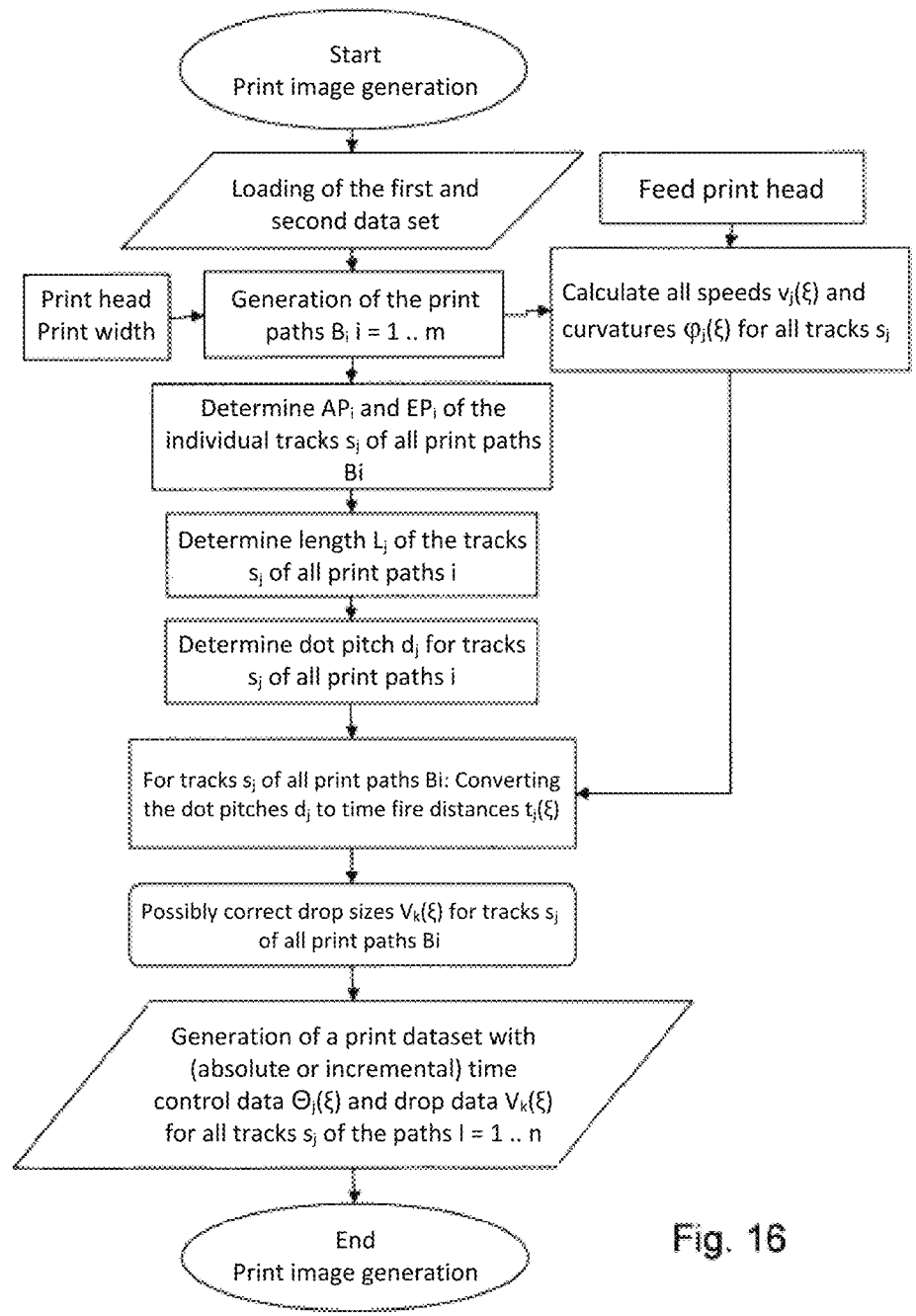

FIG. 16 illustrates an example of essential steps of the process flow in a data processing system for the creation of coating strategies, coating path paths and dot patterns according to the invention.

Figure 17:
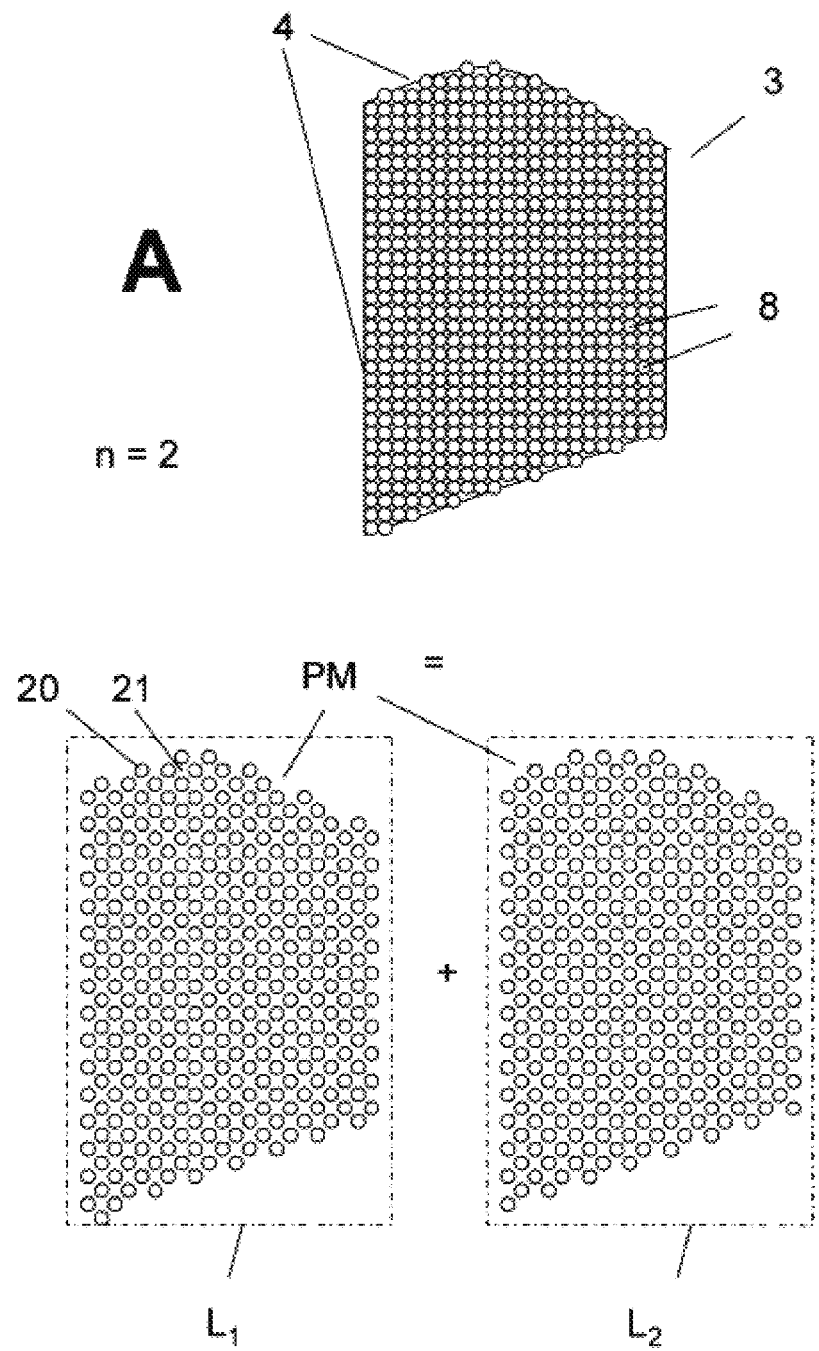

FIG. 17 illustrates a further strategy for reducing the optical perceptibility of the connection between two coating paths 6 by distributing the coating points 8 over several layers L in a data processing system.

Figure 18:
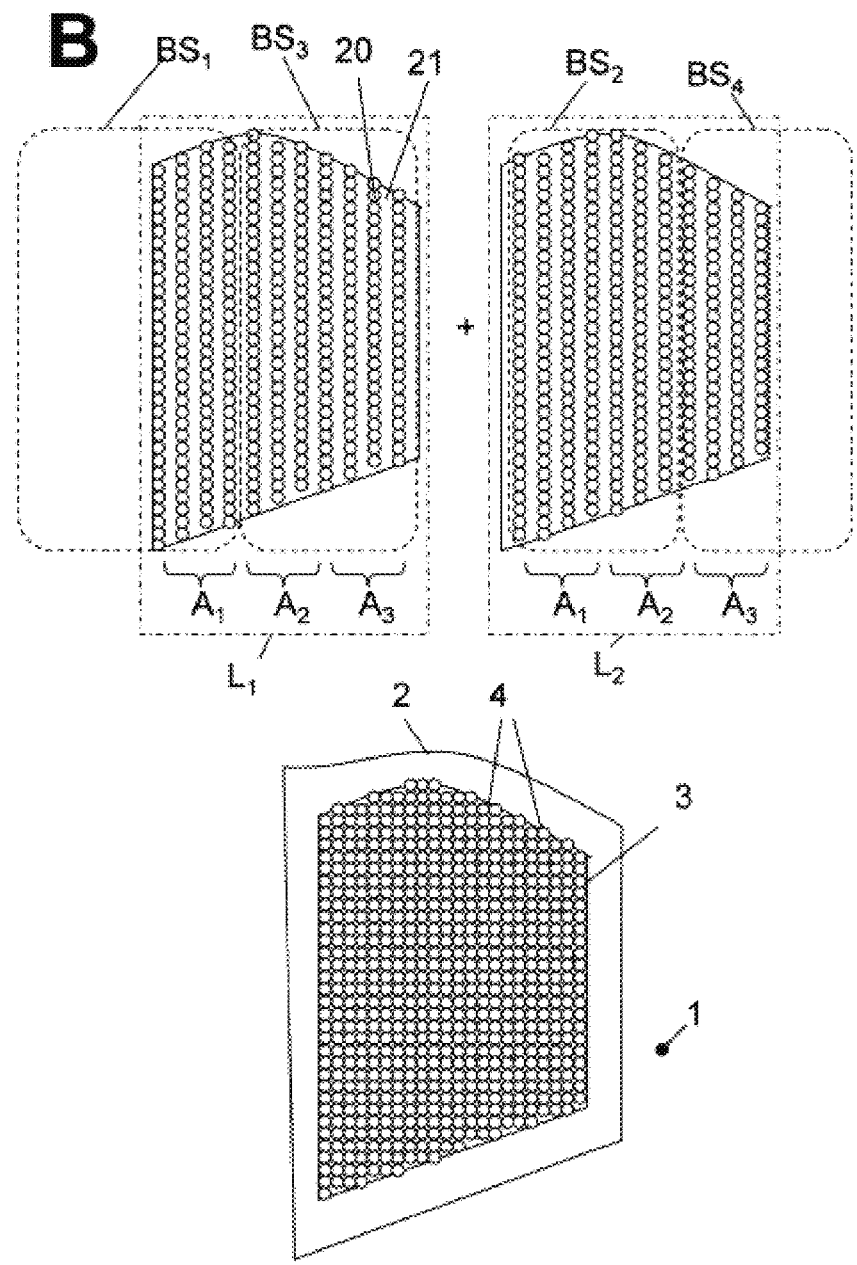

FIG. 18 illustrates a sequence of coating steps BS circulating over 2 layers, where the individual structures 20 of the two layers are lines.

Figure 19:
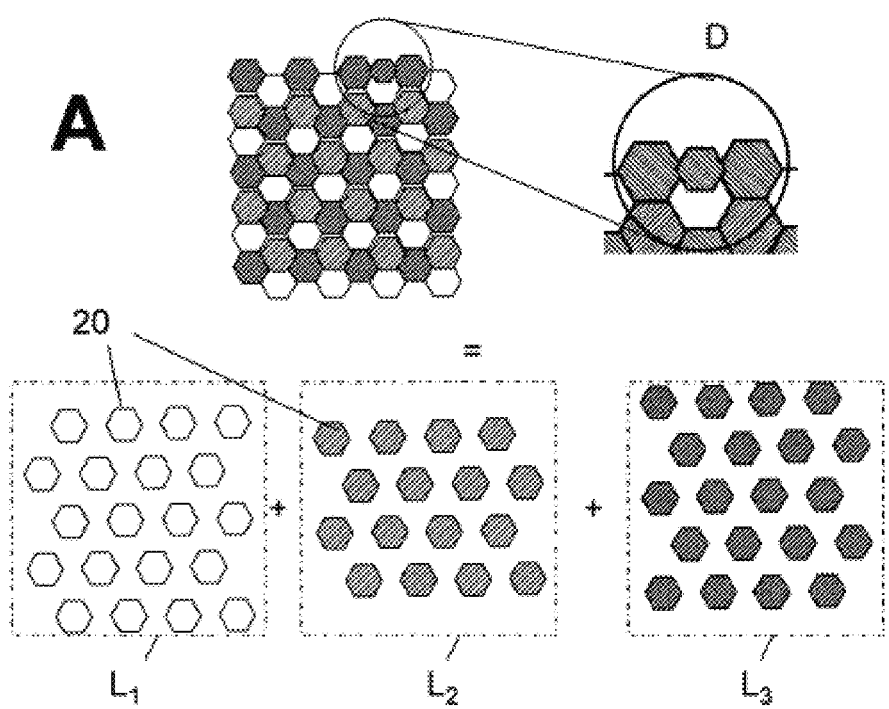

FIG. 19 shows a hexagonal pattern of coating points to illustrate related coating strategies.

Figure 20:
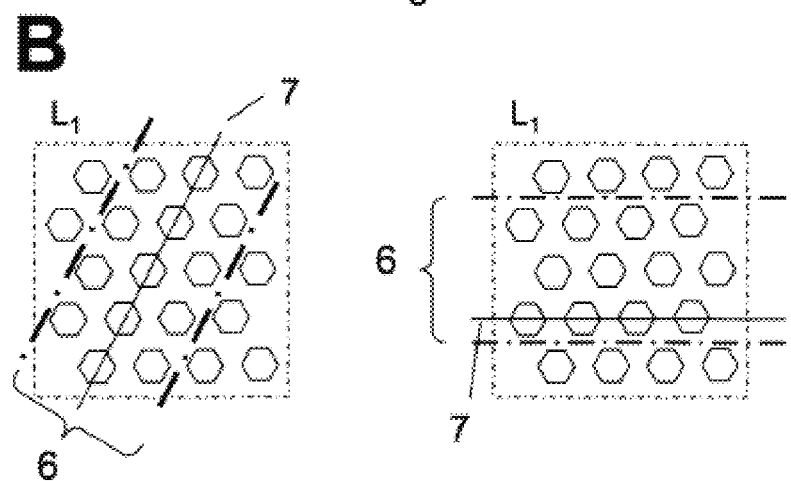

FIG. 20 illustrates exemplary orientations for the coating paths 6 and an associated track 7 for a hexagonal pattern related coating strategy.

LIST OF REFERENCE SIGNS AND LETTER ABBREVIATIONS

1 Object
2 Surface
3 Coating region
4 General edge contour
5 Coating head
6 Coating sheet
6a First coating path
6b Second coating sheet
7 Track of a printing nozzle
8 Coating point
9 Edge of a coating path
10 Overlap area
11 Rotation axis
12 Firing time
14 Coating robot
15 3D measuring unit
16 DP system
17 Real-time process control
18 Real-time head control
20 Individual structure
21 Spaces, gaps
HR (H1, H2, H4, H4) Main direction one coating path
AK Starting contour
EK End contour
SKA Side edge of a coating path
AP Starting coating point
EP End coating point
BS Coating step
L Layer
A Section
PM Dot pattern of a layer As shown above, the coating region according to the invention can help to minimize step formation on starting and end contours as far as possible. Thus, in order to reproduce them in the described manner, the first possibility is to arrange coating paths 6, with respect to a general contour, like for example an edge of the coating region 3 or another coating path 6, that they represent starting contours AK or end contours EK of the coating path, thus that either the starting coating points AP or end coating points EP are aligned with this contour. This is advantageous if the edge to the main direction HR of a coating path 6 or of each track 7 forms an angle between preferably between 15° and 165°, especially preferably between 60° and 120° at the intersection with the contour.

In principle, the coating process according to the invention (see below) allows the general use of curved coating paths 6, since different surface speeds v_S of the tracks 7 of the printing nozzles can be compensated by individual individual-nozzle control in such a way that it is possible to vary independently by adjusting the individual drop frequencies of the nozzles to their individual surface speed v_S.

During the digital print preparation stage (classic: prepress), there are extensive possibilities for planning the coating paths 6 by also or predominantly using curved coating paths 6. This is particularly advantageous in the case of three-dimensional curved surfaces 2.

According to the invention, it is therefore also possible to align a coating path 6 parallel to a curved contour. One side edge SKA of the coating path 6 is brought into exact alignment with the contour or has a parallel offset to it, i.e. a positive or negative offset.

Basically, the track lengths of the tracks 7 of a coating path 6 differ according to the radius of curvature of the track curve. Inner tracks 7 are shorter than outer tracks. According to the invention, so many coating points are inserted on track 7 between the start and end coating points of each track 7, that the dot pitch d_k is approximated as close as possible to the original dot pitch p_xy. In this way, the layer thickness of a coating path 6 remains constant over the entire width, even with curvatures.

A rotation of the coating head, which causes the row of nozzles of a coating head to change its orientation relative to the main direction HR of a coating path over time, automatically results in a change of the width of the applied coating path. FIG. 5 illustrates this possibility, with reference to the print image and process according to the invention. In order to avoid an increase in the coating thickness when the printing width is reduced, the application of the print image and process according to the invention thus includes the possibility that the width of the coating path 6 is reduced at least in one section and that the drop volume and/or the distance of the coating points 8 from each other is adapted to this section. Thus, the two parameters dot pitch and drop volume are available for a coating thickness correction.

These possibilities result in a variety of coating strategies to coat arbitrarily shaped coating region 3 using curved coating paths 6. FIG. 7a illustrates 2 the use of two possible strategies. In the vicinity of the edges of coating region 3, the coating paths 6 are mainly tangentially offset inward one or more times to the straight or curved edges 4 of coating region 3, with the coating paths 6 being adjacent to each other without gaps.

There are different ways in which the different coating paths 6 can be connected to each other, especially in the start and end areas. A small selection is shown in FIG. 7a in details A, B, C. and in FIG. 7b in detail D.

If the side edge SKA of a first coating path 6a coincides with a first contour and the side edge SKA of a second coating path 6b coincides with a second contour and the two contours enclose an angle of preferably between 60° and 120°, then the connection of the two coating paths shown in detail A is advantageous. This is shown enlarged in FIG. 8. In this case, the second contour is preferably used as starting AK or end contour EK of coating path 6. In the case of FIG. 7a and FIG. 8, the first and second contours are each edge contours 4 of the coating region 3. As shown in FIGS. 7*a* and 8, the second coating agent path 6*b*, which connects to a first coating agent path 6*a*, is attached with its starting contour AK to the side edge SKA of the first coating agent path 6*a*. The side edge SKA of the second coating agent path 6*b* and the end contour of the first coating agent path 6*a* are on a common contour which coincides with the edge contour 4 of the coating agent area.

If the side edge SKA of a first coating path 6*a* coincides with a first contour and the side edge SKA of a second coating path 6*b* coincides with a second contour and the two contours enclose an angle of preferably between 120° and 180°, then the connection of the two coating paths shown in detail B in FIG. 7*a* is advantageous. In this case, the connection of the two coating paths 6*a* and 6*b* is designed in such a way that the end contour EK of the first coating sheet 6*a* coincides with the starting contour AK of the first coating path 6*a*. Detail D in FIG. 7*b* is intended to demonstrate that it is also possible to realize small radii within a coating path 6. In this case, it is not necessary to connect a further coating path.

As shown in the center of FIG. 7*a*, another part of the coating region 3 contains coating paths 6, which have predominantly parallel, straight or curved coating path pieces 6. These have start and end contours, which in the example shown are predominantly side edges SKA of other coating paths 6.

Despite the many possibilities of using curved coating agent paths 6, it may still be possible that individual smaller areas, especially in corners, cannot be optimally coated in the form of coating agent paths 6. According to the invention, it is suggested here that individual area elements of the coating region 3 contain a free dot pattern, which is generated by a single printing nozzle of the coating head 5. It may be advantageous to use coating points 8 of different sizes and to select the position of the coating points and their individual drop volume in such a way that the area element is coated with a given coating thickness, taking into account the flow. Thus, the coating contains areas with a free dot pattern containing coating points 8 that differ significantly in size from the average size of the coating points 8 of coating region 3; see detail C in FIG. 7*a*.

According to the invention, parts of the coating on a surface 2 of the object 1 may have a dot pattern 8 which is arranged in a circle about an axis 11. This can, for example, as shown in FIG. 9, be perpendicular to surface 2, but can also be at any angle in space. Thus, for example, surface 2 in a subarea can itself be the result of the rotation of a one-dimensional surface contour about an axis 11 in space. Examples are a sphere, a pyramid, a cone or a cigar, or the fuselage of an airplane. In order to coat these surfaces, individual coating paths 6 run parallel to each other and circularly about the rotation axis 11, whereby at least individual coating paths 6 can perform a full rotation of 360 degrees, so that the end contour EK coincides with the starting contour AK of the same coating path 6*a* or 6*b* (FIG. 9). According to the invention, the coating paths 6 can then also be arranged in such a way that they are also rotationally symmetrical about rotation axis 10 relative to surface 2. Thus, according to the invention, a coating is proposed, characterized in that in coating regions 3, which are located on a surface 2 of the object 1, which is rotationally symmetrically formed at least in parts about an axis 11, the coating paths 6 are arranged in such a way that the main direction HR is tangential to the surface 2 at least in areas in the direction of rotation.

A special case is characterized in that at least parts of the coating region 3 contain a rotation pattern, whereby at least in parts of the coating region 3 the printing points 8 lie on circular tracks 7, the axis of rotation 11 of which coincides with the axis of a printing nozzle of the coating head 5. In this case, a pure rotation of the coating head takes place; see coating path 6*b* in FIG. 9.

In a special case, a coating is further characterized in that the starting coating point AP and end coating point EP of a track 7 are identical. In this case, the resulting round, but preferably elongated or line-shaped coating point 8 can be aligned to a starting contour AK and an end contour EK in such a way that it is touched by these contours on opposite sides.

A variety of other coating strategies are conceivable, for example based on segmental arc patterns, hexagonal patterns, or coating in spiral or elliptical paths. All these are made possible by the inventive basic idea defined by the features of claim 1.

One difficulty can always be to join two coating paths 6*a* and 6*b* together in such a way that no coating defects are visible. The eye is particularly sensitive to even faint signs of lines, which should be avoided, if possible. "Stitching," a technique known from printing technology, can also be applied to the process according to the invention: here, two adjacent paths 6*a* and 6*b* are positioned in such a way that they overlap each other in an overlap area 10. An auxiliary contour is then inserted into this overlap area, which does not correspond to an elongated line. In stitching, for example, this is a zigzag line. The coating points in this area are then divided between the two coating paths 6*a* and 6*b*. This case is shown in FIG. 10*a*.

Thus, according to the invention, a coating is proposed, characterized in that two coating paths 6*a* and 6*b* overlap, whereby in an overlap area 10 areas defined by auxiliary contours are divided between the first coating path 6*a* and the second coating path 6*b*. Any edge contours of a coating path 6*a* can be overlapped with any edge contour of another coating path 6*b*. Also, individual tracks 7 of the two coating paths 6*a* and 6*b* within the overlap area need not be congruent.

FIG. 10*b* shows as an example that in an overlap area 10 individual coating points 8 or groups of coating points can be freely assigned to a coating path 6*a* or 6*b*. For this purpose, it is advantageous if the coating paths 6*a* and 6*b* overlap in such a way that at least one track 7*a* of the coating path 6*a* is congruent with a track 7*b* of the coating path 6*b* and coating points 8 of these tracks are divided among the coating paths 6*a* and 6*b*. Thus, according to the invention, a coating is proposed, characterized in that two coating paths 6*a* and 6*b* laterally overlap in such a way that in the overlap area 10 at least one track 7*a* of the first coating path 6*a* and one track 7*b* of the second coating path 6*b* are substantially congruent and coating points 8 of these tracks are divided among the tracks 7*a* and 7*b* in such a way that the tracks 7*a* and 7*b* together form a continuous coating. At least one coating point 8 in the overlap area 10 can be at least 20% smaller than its neighboring coating point.

In a further embodiment according to the invention, the coating agent is glazed, i.e. at least partially transparent, for example a glazed paint or glazed varnish. In particular, this can also be a varnish or ink in one of the primary colors yellow, magenta, black or cyan. In particular, it can also contain any graphic pattern within coating region 3. If a glazed coating agent is used, optical properties of the substrate or other coatings present underneath the coating may shine through the coating. In this context, a coating agent should also be regarded as glazed if it contains pigments or scattering particles that are significantly larger than the scattered light wavelength, but are only present in the coating agent in such a small load that the coating produced from it is at least partially transparent.

According to the invention, a coating according to one of the preceding claims can then be characterized in that coating region 3 contains at least one further coating of a further coating agent.

At this point, it should be noted that the coating according to the invention can serve both functional purposes such as the protection of the surface against environmental influences or the modification of the physical or chemical properties of the surfaces (wettability, gloss, reflectivity, electrical conductivity or insulation, smoothing and filling, stone impact resistance, and many others), but essentially also for the optical decoration or graphic design of the abovementioned surfaces 2. Thus, the inventive teaching is also transferable to the field of inkjet printing, provided that the processes for print data preparation and control of print heads described below are also implemented. In this way, the effective resolution of today's printing processes can be increased by means of intelligent motion automation and coating process technology alone, or a desired resolution can be achieved using more cost-effective print heads that only offer a lower resolution.

For this purpose, it is not necessary to apply the invention's methods to all details of an image. It is sufficient to extract selected high-contrast graphic elements such as corners, borders and edges using pattern recognition algorithms and to assign them to the contours according to the invention for the application of the inventive teaching.

The generation of the coating according to the invention requires devices and processes that are presented in the following: To explain the inventive process for producing the coating according to the invention, the nomenclatures in FIG. 11 are based on a track $s_{i,j}$ of a coating path Bi, on which coating points $P_{i,j,k}$ are located, which have a distance $d_{i,j,k}$ to their subsequent coating points $P_{i,j,k+1}$. The track $s_{i,j}$ extends from an starting coating point AP to and including an end coating point EP. The indices have the following meaning:

Path index: i=1 . . . m
Track index on the path: j=1 . . . b
Index of a coating point 8 on the: k=1 . . . n The number b of tracks corresponds to the number of printing nozzles of a coating head 5, wherein several track segments can be present within a track 7, as in the case of track 7a of path 6a in FIG. 10a, which consists of three track segments. In this case, the method for placing the coating points 8 according to the invention can be applied to each of these track segments.

The index k shows that the number of coating points n on the different tracks 7 is not a constant but a variable. In the case of circular tracks, for example, the track with the largest track radius has the most coating points. Tracks that cross one or more contours that define coating-free areas have a smaller number n of coating points 8.

The basic principle for the temporal control is illustrated in FIG. 12 using a short path segment for a curvature. The coating of this segment takes place between a start time t1 and an end time t2. The individual printing nozzles are shown as circles within the coating head 5. Within the time interval the coating head 5 has moved and rotated. The firing times 12 were calculated in such a way that the coating points of each track have a constant distance $d_{i,j,k}$ to their following point. This corresponds to the value d_p derived above. The circular motion results in different time intervals Δt between the firing times 12 for each printing nozzle on each track. The time sequence of the firing times 12 for the nozzles or tracks s1 to s7 is shown in 7 diagrams.

To illustrate the indexing, the time intervals $\Delta t_{i,j,k}$ are given for selected firing times, for example $\Delta t_{111}$ and $\Delta t_{112}$ in track s1 or $\Delta t_{171}$ or $\Delta t_{171}$ in track s7. The time intervals $\Delta t_{i,j,k}$ result from the track velocities $v_{i,j,k}$, which are derived vectorially from the track velocity in main direction H and coating head rotation before in a way known to the average person skilled in the art. $v_{i,j,k}$ is the velocity of the printing nozzle of the coating path i of track j, when the coating point k is applied. This results in:

$$\Delta t_{i,j,k} = d_{i,j,k}/v_{i,j,k}$$

To determine the target time 12 for the delivery of a single coating point 8 of each track j, the value $\Delta t_{i,j,k}$ is added to the firing time of the previous dot. The implementation of the procedure requires the adherence to an exact time and sequence plan for all movements and rotations of the coating head, which has to be ensured by the coating robot. The process runs in real time, so that usually the values $v_{i,j,k}(t)$ or $\Delta t_{i,j,k}(t)$ are tracked as a function of a global running variable "time" t in a computing unit. In addition or alternatively, the movement and synchronization of the delivery points for coating points 8 can include the real-time tracking of the actual movement kinematics (time, location, speed) e.g. from sensor measurements, i.e. from actual data of the movement processing, or basically on the basis of a track-specific running variable ξ (see FIG. 11), which can be either a time variable or can represent a covered distance.

In total, various system components are required to be able to implement the coating process according to the invention. In FIG. 13, the most important components are only shown in a simplified form. In a data processing system 16, a programmer carries out the coating path planning offline according to the teachings of the present invention. This process can also be called pre-press. For this purpose, data of the surface 2 of the object 1 and the coating region 3 are processed. Data of the surface 2 may already exist in digital form from the design documents of the object 1. Alternatively, they can also be obtained by surface measurement using an optical 3D measurement 15. As a result of the prepress stage, at least one print data set is transmitted to the real-time head control 18, which contains the path-related print data, the format of which is suggested in the context of the invention below. Motion data and control data for the coating robot 17 are transmitted to a real-time data processing system 17 and further configuration and control data are transmitted to the real-time head control 18.

The real-time process comprises the motion control of the coating robot 14, the control of the printing nozzles in the coating head by means of the real-time head control 18, as well as all functions of the coating agent supply,—pressure regulation—temperature control, the coating agent change and rinsing steps, the coating head maintenance and cleaning, and the real-time monitoring of the coating processes, preparation of the surface and drying of the coating.

According to the invention, a data format is proposed which can be called an asynchronous printing process. Since in the inkjet printing technology all the nozzles in a row in a coating head 5 are fired synchronously, purely pixel-based data sets are sufficient. Usually, only the color values of the individual pixels are transmitted to the nozzles in such a way that they can be processed quickly enough in parallel at the next firing time.

The method according to the invention requires at least one data pair of information for each coating point 8: A first value is a temporal information $\Theta_{i,j,k}$ regarding the firing time of a coating point k on a track j on a path i. This value can be an absolute value $T_{i,j,k}$, which increases continuously with each coating point, or an incremental value, such as the abovementioned time interval $\Delta t_{i,j,k}$. The second value is, as in the conventional data format, a value defining the drop volume $V_{i,j,k}$. Thus, each coating point 8 with the data pair $(\Theta_{i,j,k}, V_{i,j,k})$ is uniquely determined.

There are many possibilities to store the data pairs in a data format, which can be retrieved serially as efficiently and easily as possible.

One possibility is to store all tracks of all paths for all coating points in e.g. this hierarchical way. Or it is always possible to store a number n of consecutive identical data pairs for example by the data triplet (n, $\Theta_{i,j,k}, V_{i,j,k}$). This is for example the case with straight or constantly curved coating paths 6, which already covers many cases.

In general, a coating path can be divided into several segments in such a way that the most efficient data representation in the form of data blocks is achieved. In FIG. 14, a format is proposed that includes a simple classification in the form of path segment types, thus enabling resource-saving real-time processing. It should be noted here that due to the division into path segments in the following description of FIG. 15, path segment-related data pairs are assumed which use the segment index i instead of the path index i: $(\Theta_{\xi,j,k}, V_{\xi,j,k})$. Different segments of a path are treated like different paths in terms of data technology. After a header, which may contain project data (objects, surface, template coating region, customer, coating agent, thinner, print parameters . . . ) or detailed information about the print job (number of paths, segments, tracks, coating points, calibration values, type of graphic, data format, coding), the file is structured, for example, according to coating paths, including path segments ξ.

The data block of a path segment contains the type specification (type 1: rectangular pattern, type 2 circular arc, type 3 any pattern) followed by the number n of dots of each track followed by the data pairs $(\Theta_{\xi,j,k}, V_{\xi,j,k})$ in each case.

In the simplest case of a rectangular pattern, for example, it is sufficient to specify the number of coating points for a track 7, since all tracks are identical, as well as a single data pair $(\Theta_{\xi,j,k}, V_{\xi,j,k})$, if it is a coating region without any other internal patterns (→type 1). In the case of a circular arc, a data pair $(\Theta_{\xi,j,k}, V_{\xi,j,k})$ must be specified for each track $s_j$ so that despite different track speeds, individual constant dot pitches d_p are given on each track, if this is planned (→type 2). The path segment type 3 is reserved for the general case, where each coating point 8 is assigned an individual drop volume and an individual firing time.

It should be noted that only individual segment types are worked out and given here as examples and that the multitude of possibilities cannot be dealt with exhaustively. All these are based on the inventive generation of coating points 8 of all tracks 7 of all coating paths 6.

The following is a description of the real-time coating head control process: in order to achieve a low-delay processing of the data pairs, they must first be temporarily stored in a working memory, buffer or data buffer, where they can be quickly retrieved. In contrast to the conventional coating head control, the coating head control according to the invention has a separate time control for each printing nozzle, which is able to convert the individual firing times into delay-free firing commands. Before each delivery of a coating point 8, an individual firing time can be defined. The principle of time control is explained at an individual printing nozzle: in a first step a data pair from a time information and drop size indication $(\Theta_{\xi,j,k}, V_{\xi,j,k})$ is loaded. The time information is already available here in simplified form as fire time T_next. In a loop the system time of a microprocessor is continuously compared with the target firing time T_next with microsecond accuracy ("polling") and a drop release is triggered immediately after exceeding this time. Then the data pair for the next coating point on the track is loaded and the process is repeated.

If the coating head has a larger number of printing nozzles, the time queries are performed sequentially in a sub-loop for all printing nozzles and after firing a nozzle j the corresponding data pair for this nozzle is reloaded; see here the flow chart in FIG. 14. Depending on the number of printing nozzles, this may already require a powerful microcontroller. In particular, the firing and reloading of new print data always requires a higher number of clock cycles, which can lead to an impairment of the print image, if the firing times of two print nozzles are very close together. Therefore, parallel computers, e.g. FPGAs, are generally better suited for this purpose. It should also be mentioned that real-time trigger signals for given programmed events are always transmitted from the real-time process control to the real-time coating head control, for example to start, pause or stop the print drop generation process, or to initiate pre-programmed process cycles for cleaning or changing the coating agent or for changing parameter sets.

Thus, according to the invention, methods for producing a coating on a two- or three-dimensional surface 2 of an object 1 in the form of a coating region 3 with the aid of a coating head 5, which is introduced along one or more coating paths 6, consisting of one or more tracks 7 of coating points 8 of a coating agent, are also guided over the surface 2 at a distance DD, characterized in that the starting coating point AP of at least one track 7 is applied in alignment with a starting contour AK and the end coating point EP of track 7 is applied in alignment with an end contour EK. Further coating points 8 on track 7 can be applied between a start coating point AP and an end coating point EP of at least one track 7 in a fitted manner, which can be done in such a way that a coating according to claims 1 to 19 results.

The technical process from the generation of coating data to the application of the coating can be described approximately by the following steps:

(a) The implementation of a print data generation in a data processing system on the basis of a first data set describing the surface 2 of the object and a second data set describing the coating region 3, with the following sub-steps; see also FIG. 16:

Loading of the two data sets and establishment of geometrical relations. These describe the geometric position of the coating region in relation to the geometric data of surface 2.

The generation of coating paths Bi and their tracks $s_j$ in such a way that the coating region 3 is at least completely covered by coating paths, taking into account the number and distance of the printing nozzles in the coating head and the distance DD to be maintained between coating head 5 and surface 2. For further use, the intended coating head velocities vj(ξ) and curvatures φj(ξ) are calculated for all tracks sj.

Determining the starting coating points APi and end coating points EPi of all tracks 7 on contours 4 that cross tracks 7.

If necessary, filling up further coating points 8 on tracks 7 between the start coating point AP and the end coating point EP and determining the dot pitches between adjacent coating points 8 on tracks 7. If, as in most cases, the coating points on track 7 are distributed equidistantly, then, in a subsequent step, first the path lengths Lj of the track segments sj of all printing paths i are determined, then the dot pitches dj of adjacent coating points 8 are calculated for all tracks j printing paths i; the dot pitches are converted into control times for the firing of the printing nozzles for droplet delivery; the speeds vj($\xi$) and curvatures $\varphi$j($\xi$) of all tracks sj calculated above are used for this.

If necessary, a correction of the drop size of the coating points 8 is made so that a target coating thickness is achieved.

The generation of a print data set, which contains coating point-specific data elements, each containing at least one time or location-related information and one volume-related information for one or more coating points 8.

The generation of motion data for the control of a coating robot under consideration of the distance DD.

(b) Transferring the print data set to the real-time coating head control.

(c) Transferring the motion data to the control of the coating robot.

(d) Finally, performing the coating process based on the print data and motion data including drying processes.

The coating process is performed with a device for producing a coating on a two- or three-dimensional surface 2 of an object 1 in the form of a coating region 3, composed of coating points 8 of a coating agent, which are arranged along one or more tracks 7 one or more coating paths 6, characterized in that a data processing system 16 for generating a print data record, which contains coating point-specific data elements, each of which contains at least one time or location-related information and one volume-related information on one or more coating points 8, and for generating the path and control data of the coating process, a real-time process control 17, a coating robot 14 to move the coating head at a distance DD above the surface 2 of the object 1, a real-time coating head controller configured to asynchronously control at least two print nozzles of the coating head, so that the starting coating points AP and end coating points EP of tracks 7 are adapted to contours 4 crossing tracks 7, a coating head 5 with at least one row of printing nozzles suitable for applying the coating agent in discrete quantities to the surface without contact.

In addition to the measures described in FIG. 10*a* and FIG. 10*b* for reducing the optical perceptibility of the connection between two coating paths 6 within a coating region 3, such as 6*a* and 6*b*, other strategies in accordance with the invention are suitable, which are described below:

The basic idea of these further strategies is that the coating points 8 of the coating region 3 are distributed in a first process step A (FIG. 17: Example dot pattern) to n virtual coating layers, in the following briefly called layer L. The distribution of the coating points 8 to different layers $L_i$, i=1 . . . n, is done in a data processing system or a printer driver. Thus, each layer $L_i$ contains a subset of all coating points 8 of the coating region 3, which is called dot pattern $PM_i$ of layer $L_i$. The dot patterns $PM_i$ of all layers $L_i$ complement each other after processing all layers L to a complete coating.

As illustrated in FIG. 17, dot patterns PM are composed of dots, dot groups or lines (FIG. 18), preferably arranged in regular intervals over the coating region 3, in the following referred to as individual structures 20, between which gaps 21 are located, which are filled by individual structures 20 of the remaining layer L.

An essential feature is that the dot patterns $PM_i$ of the individual layer $L_i$ are such that they occupy the gaps in the dot patterns $PM_j$ of the other layer $L_j$, and that coating points 8 of different layers do not coincide locally, i.e. do not have the same position. Thus, the dot patterns PM of the different layer L are complementary. A complete coating requires the processing of all layers $L_i$.

The different layers $L_i$ are applied to the surface 2 in a second process step B (FIG. 18: Example line pattern), the application step, with one or more, but usually a multitude of n coating steps $BS_1$ to BS according to a processing strategy using a coating head 5. A coating step BS includes exclusively all individual structures 20 of a single layer L. For example, a coating step BS includes all individual structures 20 of a single coating path 6 from a layer L, if a coating head 5 is guided over the object.

Coating points 8 associated with the same layer L can have identical or different dot sizes on the surface 2, corresponding to lines of identical or different line widths. Similarly, coating points 8 associated with different layers $L_i$ may have identical or different dot sizes on surface 2, corresponding to lines of identical or different line widths. Dot size and line width result from the drop-on-demand drop size, the kinetics and the surface condition.

The aim should be that the drop size or line width of the first coating step $BS_1$ applied at one point on surface 2 in the processing sequence is selected small enough that the individual structures 20 (dots or lines) of the layer $L_i$ associated with $BS_1$ are imaged on the surface as isolated individual structures 20, i.e. as isolated dots and/or lines that do not or only slightly touch each other and do not or only slightly run into each other. It should be ensured that, due to tolerances of, for example, the drop-on-demand technology, the application processes or the substrate properties (e.g. surface texture or local differences in wettability), isolated or increased contact between the mentioned printing dots or lines may occur.

It may also be advantageous if the drop size or line width of the last coating step $BS_n$ applied at a point on surface 2 in the processing sequence is larger than the drop size or line width applied at this point in the previous coating steps $BS_i$ and is selected large enough to ensure that any gaps in the coating are completely filled with coating material.

Preferred processing strategies are described below. It is essential that the individual structures 20 processed during a coating step BS originate from only one individual layer L.

Preferably, a coating head 5 is guided over the surface 2 of a (3-dimensional) object 1 due to its limited width in adjoining coating paths 6. Preferably, all individual structures 20 of a layer L, which are covered by a respective coating path 6, are applied. The individual structures 20 applied to the surface 2 in a coating step BS originate from a single layer L.

According to a first processing strategy, all individual structures 20 of a layer $L_i$ are first applied by one or more coating steps BS, followed by those of the remaining layers. This means, for example, that in the case of two layers L (n=2), the individual structures 20 of both layers $L_1$ and $L_2$ are applied completely one after the other to the surface 2, e.g. by a multitude of coating paths 6.

Since the coating of surfaces in the drop-on-demand process is based on the fact that adjacent coating points must come into contact with each other while still wet in order to form a coherent layer by the mutual interlacing (flow) of the coating agent, the processing strategy just described can only be applied if it is ensured that the individual structures 20 of the first layer $L_1$ applied in the first step are still sufficiently wet. As a rule, this means that coating region 3 must be sufficiently small for this.

According to the invention, a gradient therefore always takes place between an isolated individual structure 20 of a first layer $L_1$ and a second layer $L_2$, and there is a requirement at each point of the coating region 3 that the time $t_{L2-L1}$ that elapses between the application of an individual structure 20 of the first layer $L_1$ and an individual structure 20 of the second layer $L_1$ adjacent to it must be shorter than an open time to of the coating agent on surface 2, above which no sufficient gradient can take place any longer. It is therefore preferable to try to determine a processing strategy in such a way that for each point of the coating region 3 the following applies:

$t_{L2-L1} < t_0$ is fulfilled, where $t_0$ is in the order of a few seconds or minutes. This requirement leads to further processing strategies:

Basically, a coating region 3 is coated by means of a drop-on-demand coating head 5 in at least two coating steps BS, which contain complementary dot patterns PM, preferably evenly distributed over the coating region 3, each containing dots or lines isolated from each other.

The application of the coating points 8 in the individual coating steps BS is performed serially in preferably parallel coating paths 6, or with the aid of coating strategies as described above and in FIGS. 3 to 10, for example guided by a multi-axis coating robot 14.

The further processing strategies are better suited for large coating regions 3 and are characterized by the fact that in successive coating steps BS individual structures 20 are applied to the surface 2 alternately from different layers, whereby these individual structures 20 represent a subset of the dot patterns PM of the corresponding layer L from which they originate.

The principle is illustrated in FIG. 18. In the example, the coating points 8 of the coating region 3 are distributed on two layers $L_1$ and $L_2$; the individual structures 20 are lines. This selection is made with regard to a serial processing by means of four coating steps $BS_1$, $BS_2$, $BS_3$ and $BS_4$, which correspond, for example, to coating paths 6 using a coating head 5, with the lines corresponding to tracks 7 of the printing nozzles. These are n=2 layers; the individual structures (lines) applied in the coating steps are alternately from layer L1 and layer L2:

| Coating step | Individual structure 20 from layer |
| --- | --- |
| $BS_1$ | $L_1$ |
| $BS_2$ | $L_2$ |
| $BS_3$ | $L_1$ |
| $BS_4$ | $L_2$ |

According to the invention, in this process, in a first coating step $BS_1$ at least a first section $A_1$ of the coating region 3 is coated with individual structures 20 of the first layer $L_1$, which do not yet form a closed layer. In a second coating step $BS_2$, individual structures 20 of the second layer $L_2$ are used to coat the first section $A_1$ and additionally a second section $A_2$, whereby in section $A_1$ a closed coating now results from the individual structures 20 of $L_1$ and $L_2$ and in section $A_2$ an unclosed layer of individual structures 20 of layer $L_2$. In a third coating step $BS_3$, individual structures 20 of the first layer $L_1$ are again used to coat the second section $A_2$ and additionally a third section $A_2$, whereby a closed coating is now also produced in section $A_2$ from the individual structures 20 of $L_2$ and $L_1$ and an unclosed layer of individual structures 20 of layer $L_1$ is produced in section $A_3$. This alternating coating with individual structures 20 of $L_1$ and $L_2$ can now be continued analogously infinitely and thus large coating regions can be coated using this method. Only 4 coating steps BS are shown in FIG. 18. In the last (fourth) coating step $BS_n$ ($BS_4$), individual structures 20 of the last resulting layer $L_{1 \; or \; 2}$ (here $L_2$) are used to coat the penultimate (here third) section $A_{n-2}$ (here A3), so that now also in the last section $A_{n-2}$ from the individual structures 20 of $L_1$ and $L_2$ a closed coating is present.

Thus, within a sequential coating process consisting of several coating steps BS, at least one coating step BS is carried out, with which regularly arranged individual structures 20 such as dots or lines interrupted by spaces 21 are applied to a surface of an object in two sections $A_i$ and $A_{i+1}$, characterized in that in the first section $A_i$ an incomplete layer previously applied is completed by the regularly arranged individual structures 20 to form a closed coating and in a second section $A_{i+1}$ an incomplete layer of individual structures 20 is applied which has complementarily arranged interspaces 21.

FIG. 19 exemplarily describes a distribution of the coating points 8 of the coating region 3 to three layers $L_1$, $L_2$ and $L_3$ in a first process step A. As shown in the top of the figure, here the point arrangement of the coating points 8 is a hexagonal arrangement. This becomes clear by displaying the points as hexagons. The distribution of the coating points 8 on the layers 1 to 3 is illustrated by the hatching. Thus, the total layer (upper picture) is composed of the layers $L_1$, $L_2$ and $L_3$, which are shown below.

The application of the layer in the second process step B runs analogously, as described above for the case with two layers. In FIG. 20, two possible orientations, in particular main directions, for coating paths 6 and an associated track 7 are shown as an example and purely schematic.

While in an orthogonal arrangement of the coating points 8 in rows and columns only two main directions and two diagonals are possible as directions of movement of the coating head 5 or the coating tracks 6, in a hexagonal arrangement there are three main directions and three diagonals, whereby the diagonal is always the bisector of the angle to two main directions.

When applying individual structures 20 of a layer $L_i$ with a coating path 6, the coating path 6 can basically be aligned along any main direction or diagonal, depending on the nozzle distance of the coating head. For example, in the case of the hexagonal dot arrangement, coating steps BS or coating paths 6 of all layers $L_1$ can be aligned along the same main direction or diagonal, which has the advantage that a coating region 3 can basically be coated starting from one side with long and parallel coating paths 6 towards the opposite side, which has the advantage that a coating region 3 can basically be coated from one side with long and parallel coating tracks 6 towards the opposite side. It is possible to work with coating steps BS, which use the individual structures 20 circulating in the layers $L_1$ to $L_3$:

| Coating step | Individual structure 20 from layer |
| --- | --- |
| $BS_1$ | $L_1$ |
| $BS_2$ | $L_2$ |

| Coating step | Individual structure 20 from layer |
|---|---|
| $BS_3$ | $L_3$ |
| $BS_4$ | $L_1$ |
| ... | ... |

FIG. 19 shows a special feature of a hexagonal point pattern (Detail D): Depending on the angular position of an edge contour 4, coating points of two layers may alternately protrude or recede. In order to obtain a straight edge nevertheless, it is suggested according to the invention to place coating points 8 of reduced size between those coating points in the last applied coating step $BS_n$; see enlargement in FIG. 19, which protrude from the edge contour 4.

It should be noted that the inventive methods and the proposed arrangements of coating points 8 are basically not limited to the examples given here, but represent general solutions that can be linked together. For example, dot arrangements according to FIGS. 3 to 10 can be distributed to different layers L and the individual structures of layers $L_i$, i=1 ... n, serially or section by section can be applied to a surface 2 to be coated by coating steps $BS_j$, j=1 ... k, especially coating paths 6. The dot size of each coating point 8 to be applied can be varied.

As described above, a coherent coating in coating region 3 essentially consists of coating points 8 of the individual structures 20 of a first layer $L_1$ running together with coating points 8 of the individual structures 20 of a second layer $L_2$ and forming a layer. Since the individual structures 20 are substantially arranged or distributed regularly over the entire coating region 3, the way in which the coating points 8 run over the coating region 3 is always the same and independent of the coating paths.

In contrast, the coating agent is always applied over the entire surface in parallel paths 6 according to the prior art. This results in visible differences in the course between areas in the middle of each path 6, where adjacent coating points 8 are applied almost simultaneously and can run optimally, and the edges 9 of the coating paths 6, where adjacent paths, which are applied with a larger time offset of seconds to minutes, connect to each other and due to the time offset, a worse course between the adjacent tracks 7 of the two adjacent coating paths 6 takes place.

The invention claimed is:

1. A method for applying a coating pattern of a coating agent to a flat or curved surface of an object by means of a print head, which ejects coating agent in jets or drops from a plurality of printing nozzles arranged in at least one row, comprising the steps of:
   moving the print head at a distance over the surface by means of a coating robot in a plurality of coating paths which contain tracks of coating points corresponding to the printing nozzles, the movement taking place obliquely to a starting contour AK and/or an end contour EK, wherein starting contour AK and end contour EK represent edges of a coating region,
   determining, for each of the tracks, a respective track length from the starting contour to the end contour,
   controlling the individual nozzles of the print head in such a way that the starting coating points AP of the tracks touch the starting contour AK tangentially or have a constant distance from the starting contour AK or that the end coating points EP of the tracks touch the end contour (EK) tangentially or have a constant distance from the end contour EK and that, for each of the tracks, further points are distributed depending on the respective track length between the respective starting coating point AP and the respective end coating point EP.

2. A method according to claim 1, wherein starting coating points AP of the tracks contact the starting contour (AK) tangentially or are at a constant distance from the starting contour AK, and additionally end coating points EP of the tracks contact the final contour (EK) tangentially or are at a constant distance from the final contour EK.

3. A method according to claim 2, wherein the control of the individual nozzles of the print head is carried out in such a way that the tracks between the starting coating points AP and end coating points EP contain further coating points which are arranged equidistantly and that the distances between adjacent coating points of at least two tracks are not identical.

4. A method according to claim 3, wherein the number of further coating points of the tracks between the starting coating points AP and end coating points EP is determined at least in sections in such a way that the distance between the coating points of the tracks is of the order of magnitude of the distance between adjacent tracks.

5. A method according to claim 1, wherein at least a selection of coating points additionally have an individual stochastic offset (Δd) along the track in positive or negative track direction to adjacent points.

6. A method according to claim 1, wherein the volume of the drops from the plurality of printing nozzles is adapted in such a way that the coating thickness of the coating agent is constant on average.

7. A method according to claim 1, wherein at least one section of the coating path has a curvature about a line perpendicular to the surface.

8. A method according to claim 1, wherein the coating path is reduced in its width at least in one section thereof and the volume of the drops from the plurality of printing nozzles and/or the distance of the coating points from one another is adapted in such a way that the coating thickness of the coating agent is constant on average along the coating path section of reduced width.

9. A method according to claim 1, wherein the coating paths run predominantly tangentially inwardly offset one or more times to the straight or curved edges of the coating pattern, the coating paths being connected laterally to one another without gaps.

10. A method according to claim 9, wherein at least a part of the coating pattern contains coating paths which have predominantly parallel, straight or curved coating path sections.

11. A method according to claim 1, wherein individual area elements of the coating pattern contain a free dot pattern generated by a single print nozzle of the print head.

12. A method according to claim 11, wherein the free dot pattern contains coating points which differ substantially in size from the average size of the coating points of the coating pattern.

13. A method according to claim 1, wherein the starting coating point AP and the end coating point EP of a track are identical.

14. A method according to claim 1, wherein in sections of the coating pattern which are located on the surface of the object which are rotationally symmetrically shaped at least in part with respect to an axis, the coating paths are arranged in such a way that a main direction HR of the coating paths runs tangentially to the surface in a direction of rotation about the axis at least in those sections.

15. A method according to claim 1, wherein at least in parts of the coating pattern the coating points lie on circular tracks, whose axis of rotation coincides with the axis of a print nozzle of the print head.

16. A method according to claim 1, wherein the coating paths comprise a first coating path and a second coating path that overlaps with the first coating path, whereby in an overlap area portions defined by auxiliary contours are divided between the first coating path and the second coating path.

17. A method according to claim 1, wherein the coating paths comprise a first coating path and a second coating path, and the first and second coating paths overlap laterally creating an overlap region and in the overlap region at least a first track corresponding to the first coating path and a second track corresponding to the second coating path are substantially congruent and coating points are divided among the first and second tracks and in such a way that the first and second tracks and together form a continuous coating.

18. A method according to claim 17, wherein in the overlap region at least one printing dot is at least 20% smaller than its adjacent printing dot.

19. A method according to claim 1, wherein the coating agent is glazed and the coating pattern contains graphic elements.

20. A method according to claim 1, wherein the coating pattern contains at least one further coating of a further coating agent.

21. A method according to claim 1 further comprising the following steps:
  execution of a print data generation in a data processing system on the basis of a first data set describing the surface of the object and a second data set describing the coating region, with the following sub-steps:
    loading of the data sets and establishment of geometric relationships;
    generating coating paths and their tracks in such a way that the coating region is at least completely covered by coating paths, taking into account a distance DD between the print head and the surface;
    determining the position of the starting coating points AP and/or end coating points EP of the tracks on contours which cross the tracks at an angle, so that these touch the contours tangentially and/or so that these have a constant distance to the points of intersection of the contours with the tracks;
    if necessary, filling up further coating points on the tracks between the starting coating point AP and the end coating point EP and determining the point spacing between adjacent coating points on the tracks;
    if necessary, correcting the drop size of the coating points so that a target layer thickness is achieved;
    generating a print data set containing coating point-specific data elements, each containing at least one time or location-related information and one volume-related information for one or more coating points;
    generating motion data for the control of a coating robot taking into account the distance DD;
    transferring the print data set to a real-time print head control;
    transferring the motion data to the coating robot controller;
    performing the coating process based on the print data and motion data.

* * * * *

UNITED STATES PATENT AND TRADEMARK OFFICE
CERTIFICATE OF CORRECTION

PATENT NO. : 11,679,597 B2
APPLICATION NO. : 17/048329
DATED : June 20, 2023
INVENTOR(S) : Burkhard Büstgens Page 1 of 1

It is certified that error appears in the above-identified patent and that said Letters Patent is hereby corrected as shown below:

In the Claims

Column 20, Line 26, Claim 5, please change "stochastic offset (Ad)" to --stochastic offset ($\Delta d$)--.

Signed and Sealed this
Twenty-ninth Day of August, 2023

Katherine Kelly Vidal
*Director of the United States Patent and Trademark Office*